United States Patent
McGilly

(10) Patent No.: US 8,688,121 B2
(45) Date of Patent: Apr. 1, 2014

(54) UE HANDLING OF COMMON CONFIGURATION AFTER HANDOVER

(75) Inventor: Paul McGilly, Cambridge (GB)

(73) Assignee: BlackBerry Limited, Waterloo, Ontario (CA)

( * ) Notice: Subject to any disclaimer, the term of this patent is extended or adjusted under 35 U.S.C. 154(b) by 128 days.

(21) Appl. No.: 13/097,793

(22) Filed: Apr. 29, 2011

(65) Prior Publication Data

US 2011/0269466 A1 Nov. 3, 2011

Related U.S. Application Data

(60) Provisional application No. 61/330,217, filed on Apr. 30, 2010.

(51) Int. Cl.
*H04W 36/00* (2009.01)

(52) U.S. Cl.
USPC ........ 455/436; 455/423; 455/456.1; 455/560; 455/439; 455/443; 370/329; 370/331; 370/442

(58) Field of Classification Search
USPC ............... 455/436, 423, 456.1, 560; 370/328, 370/329, 331; 450/439, 443
See application file for complete search history.

(56) References Cited

U.S. PATENT DOCUMENTS

2013/0010964 A1 * 1/2013 Fong et al. .................... 380/277

FOREIGN PATENT DOCUMENTS

JP 2003153324 A 5/2003

OTHER PUBLICATIONS

3GPP TS 36.331 V8.9.0; 3rd Generation Partnership Project; Technical Specification Group Radio Access Network; Evolved Universal Terrestrial Radio Access (E-UTRA); Radio Resource Control (RRC); Protocol Specification (Release 8); Mar. 2010; 211 pages.
PCT International Search Report; Application No. PCT/EP2011/056975; Sep. 5, 2011; 3 pages.
PCT Written Opinion of the International Searching Authority; Application No. PCT/EP2011/056975; Sep. 5, 2011; 8 pages.
3GPP TS 36.331 V9.2.0; 3rd Generation Partnership Project; Technical Specification Group Radio Access Network; Evolved Universal Terrestrial Radio Access (E-UTRA); Radio Resource Control (RRC); Protocol Specification; Release 9; Mar. 2010; 248 pages.
3GPP TSG-RAN WG2 Meeting #70bis; "Handling of Radio Resource Config. Common After Handover;" R2-103766; Stockholm, Sweden; Jun. 28-Jul. 2, 2010; 4 pages.
3GPP TSG RAN WG2 Meeting #70bis; "Handling Radio Resource Config. Common After Successful Handover;" R2-103765; Stockholm, Sweden; Jun. 28-Jul. 2, 2010; 2 pages.
3GPP TSG-RAN WG2 Meeting #70; "Handling of Radio Resource Config. Common After Handover;" R2-103001; Montreal, Canada; May 10-14, 2010; 4 pages.
Japanese Office Action dated Dec. 11, 2013 as received in co-pending Japanese Application No. 2013-506686; 2 pages; (No English translation available).

* cited by examiner

*Primary Examiner* — David Q Nguyen
(74) *Attorney, Agent, or Firm* — Conley Rose, P.C.; J. Robert Brown, Jr.

(57) ABSTRACT

A method for a user equipment (UE) operating in a Long Term Evolution network. The method includes the UE receiving a command for a handover from a source cell to a target cell. The method further includes, when the UE has valid stored system information for the target cell, the UE discarding a dedicated radioResourceConfigCommon information element received from the source cell in the handover command and the UE applying radio resource configuration information retrieved from the stored system information.

13 Claims, 4 Drawing Sheets

UE HANDLING OF COMMON CONFIGURATION AFTER HANDOVER

CROSS-REFERENCE TO RELATED APPLICATION

This application claims priority to U.S. Provisional Patent Application No. 61/330,217 filed Apr. 30, 2010 and entitled "UE Handling of Common Configuration After Handover," filed Apr. 30, 2010 which is incorporated herein by reference.

BACKGROUND

As used herein, the terms "user equipment" and "UE" might in some cases refer to mobile devices such as mobile telephones, personal digital assistants, handheld or laptop computers, and similar devices that have telecommunications capabilities. Such a UE might consist of a device and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might consist of the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user. Also, the terms "user equipment," "UE," "user agent," "UA," "user device," and "mobile device" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an Evolved Universal Terrestrial Radio Access Network (E-UTRAN) node B (eNB), a wireless access point, or a similar component rather than a traditional base station. LTE may be said to correspond to Third Generation Partnership Project (3GPP) Release 8 (Rel-8 or R8), Release 9 (Rel-9 or R9), and Release 10 (Rel-10 or R10), and possibly also to releases beyond Release 10, while LTE Advanced (LTE-A) may be said to correspond to Release 10 and possibly also to releases beyond Release 10.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
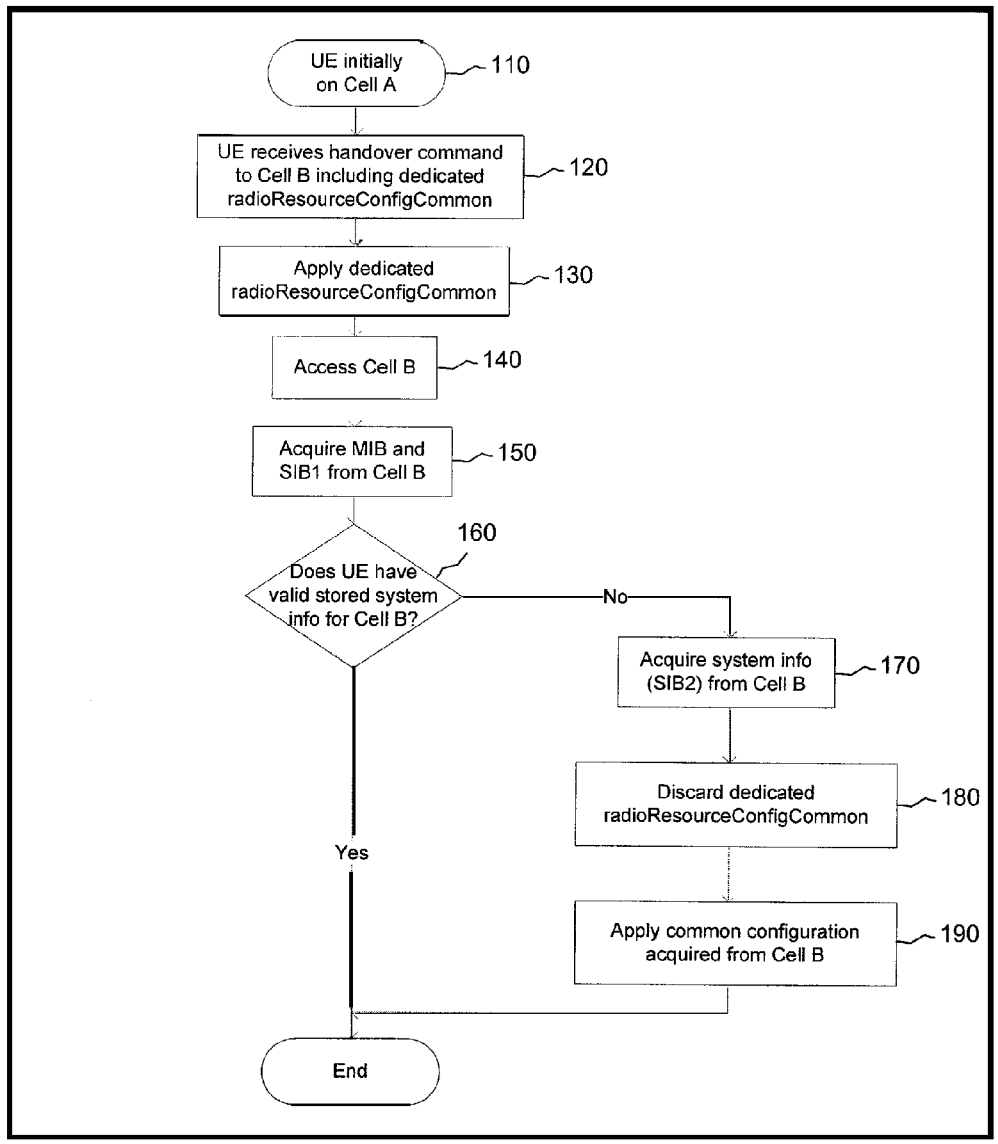
FIG. 1 is a flow chart of an application of common configuration including radioResourceConfigCommon according to the prior art.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure deals with the handover of a UE in an LTE/E-UTRA network. A cell in which a UE is currently located and from which the UE might be handed over will be referred to herein as a source cell. A cell to which a UE might be handed over or to which a UE has just been handed over will be referred to herein as a target cell.

When a UE is communicating within an E-UTRAN, it might receive an information element (IE) known as the radioResourceConfigCommon. This IE specifies a set of radio configuration parameters of a cell that can include physical layer parameters, random access parameters, and the like. The values of the parameters may be different in different cells of an E-UTRAN. The parameters are used by the UE to establish a connection with a target cell, and they must be known by the UE in order for radio communication between the UE and E-UTRAN to take place. The following table lists parameters that might be present in the dedicated radioResourceConfigCommon and the location of the equivalent broadcast parameters.

| Dedicated radioResourceConfigCommon | | Location of equivalent field in a |
| --- | --- | --- |
| Field | Optional | broadcast message |
| rach-ConfigCommon | Y | SIB2-radioResourceConfigCommon |
| prach-Config | N | SIB2-radioResourceConfigCommon* |
| pdsch-ConfigCommon | Y | SIB2-radioResourceConfigCommon |
| pusch-ConfigCommon | N | SIB2-radioResourceConfigCommon |
| phich-Config | Y | MIB |
| pucch-ConfigCommon | Y | SIB2-radioResourceConfigCommon |
| soundingRS-UL-ConfigCommon | Y | SIB2-radioResourceConfigCommon |
| uplinkPowerControlCommon | Y | SIB2-radioResourceConfigCommon |
| antennaInfoCommon | Y | Blind decode of MIB |
| p-Max | Y | SIB1 |
| tdd-Config | Y | SIB1 |
| ul-CyclicPrefixLength | N | SIB2-radioResourceConfigCommon |
| | | SIB2-radioResourceConfigCommon bcch-Config |
| | | SIB2-radioResourceConfigCommon pcch-Config |

*Prach-Config-optionally is a sub-IE level rather than the whole IE being optional. If an optional field is not present the UE uses the same value(s) in the target cell as in the originating cell.
Bcch-config and pcch-config are not configured by the dedicated message. The UE can only obtain them from the broadcast messages in the target cell.

The radioResourceConfigCommon can be provided to the UE in two different ways. First, each cell in an E-UTRAN typically broadcasts its radioResourceConfigCommon in the cell's system information, and more specifically in the information element System Information Block Type 2 (SIB2) in a SystemInformation message. When the radioResourceConfigCommon is broadcast in system information, it can be referred to as the common radioResourceConfigCommon, and the parameters are received as defined in 3GPP Technical Specification (TS) 36.331 in the IE RadioResourceConfigCommonSIB. A UE may be able to receive a common radioResourceConfigCommon that is broadcast from the source cell in which it is currently located and/or from a target cell to which the UE might be handed over. Upon receiving SystemInformationBlockType2, the UE is required to obey the following procedure from section 5.2.2.9 of 3GPP TS 36.331:

---

5.2.2.9 Actions upon reception of SystemInformationBlockType2

Upon receiving SystemInformationBlockType2, the UE shall:
    1> apply the configuration included in the
        radioResourceConfigCommon;

---

Second, the UE might receive the radioResourceConfigCommon of a target cell in a dedicated message to the UE from the UE's current source cell, and the parameters are received in the IE RadioResourceConfigCommon as defined in 3GPP TS 36.331. That is, the radioResourceConfigCommon is also included in a mobilityControlInfo IE within an RRCConnectionReconfiguration message. The RRCConnectionReconfiguration message is a dedicated message that is sent from the E-UTRAN to a specific UE, as opposed to a broadcast message that is sent from the E-UTRAN to many UEs in a cell. When radioResourceConfigCommon is included in this message it can be referred to as the dedicated radioResourceConfigCommon. The inclusion of mobilityControlInfo in RRCConnectionReconfiguration is commonly known as a handover command. The dedicated radioResourceConfigCommon is included in the handover command in order to avoid delay that would occur if the UE had to acquire the common configuration including radioResourceConfigCommon from broadcast channels of the target cell. Inclusion of the dedicated radioResourceConfigCommon is mandatory at handover. In performing the handover the UE is required to obey the following procedure from section 5.3.5.4 of 3GPP TS 36.331:

---

5.3.5.4 Reception of an RRCConnectionReconfiguration including the mobilityControlInfo by the UE (handover)

If the RRCConnectionReconfiguration message includes the mobilityControlInfo and the UE is able to comply with the configuration included in this message, the UE shall:
    1> configure lower layers in accordance with the received
        radioResourceConfigCommon;

---

In the case where the IE radioResourceConfigCommon is received in a dedicated message, the parameters within the IE may be signaled as a delta or change compared to the current configuration that is in use within the source cell. If one or more parameter settings do not change in the target cell compared to the source cell, then that parameter or those parameters may not need to be included in the IE, thus reducing the size of the IE to be included in the handover command.

The common configuration of a cell is the aggregate of the information received by the UE from the broadcast channels of the cell. Specifically, it includes the Master Information Block (MIB) and System Information Blocks (SIBs) of the cell, including the radioResourceConfigCommon from SIB2.

After being handed over to a target cell, the UE acquires system information from the target cell, namely the MIB and System Information Block Type 1 (SIB1), plus other SIBs as needed. The UE can store this system information, and as the UE moves from cell to cell, the UE can store system information for multiple cells. If the UE returns to a previously visited cell, the UE might be able to reuse some of the previously stored system information for that cell if the system information is still valid. The validity of system information can be determined through the use of a value tag in SIB1. The value tag is a sequence number that identifies a set of system information for a cell. If the value tag of a UE's stored system information matches the value tag in the SIB1 that the UE receives from a cell to which the UE has returned and the three hour validity timer has not expired, the UE knows that the stored system information is valid for that cell.

Once the handover is completed, the UE is currently required to obey the following procedure from section 5.2.2.4 of 3GPP TS 36.331:

---

1> following successful handover completion to a cell for which the UE does not have
    stored a valid version of the system information required in RRC_CONNECTED, as
    defined in 5.2.2.3:
    2> acquire, using the system information acquisition procedure as defined in 5.2.3,
        the system information required in RRC_CONNECTED, as defined in 5.2.2.3;
    2> upon acquiring the concerned system information:
        3> discard the corresponding radio resource configuration information included
            the radioResourceConfigCommon previously received in a dedicated
            message, if any;

---

In other words, if the UE does not have valid stored system information for the target cell, the UE is required to acquire a new SIB2, which contains the common radioResourceConfigCommon of the target cell. The UE is then required to discard the dedicated radioResourceConfigCommon it previously received from the source cell and apply the common configuration including the common radioResourceConfigCommon it acquired from the target cell. Section 5.2.2.9 of TS 36.331 mandates the application of the common radioResourceConfigCommon on the reception of SIB2.

There are several reasons why the UE may not have valid stored system information for a cell. First, the handover may be to a cell that the UE has not encountered before. Second, stored system information expires after three hours, and more than three hours may have passed since the UE was last on the target cell. Third, the value tag in SIB1 of the target cell may not match the value tag associated with the stored system information, invalidating the stored system information. Fourth, a limited number of cells may be stored in the cell database. When a new cell is encountered, the oldest entry may be discarded. If the UE is highly mobile, a stored entry may have been discarded. Fifth, the UE may not store system information from some previously encountered cells. The storage of information from previously encountered cells is an optional implementation for the mobile device, although it is desirable for the device to implement such behavior in order to minimize power consumption associated with reading system information.

The existing behavior with respect to common configuration, and common radioResourceConfigCommon in particular, as specified in TS 36.331, is described by the flow chart of FIG. 1. At block 110, the UE is initially on a source cell, or cell A. At block 120, the UE receives a handover command to a target cell, or cell B, that includes a dedicated radioResourceConfigCommon for cell B. At block 130, the UE applies the dedicated radioResourceConfigCommon. At block 140, the UE accesses cell B. That is, the handover is complete at this point. At block 150, the UE acquires the MIB and SIB1 from cell B. At block 160, the UE determines whether it has valid stored system information for cell B. If the UE does not have valid stored system information for cell B, the flow continues to block 170, where the UE acquires SIB2 from cell B. SIB2 contains cell B's common radioResourceConfigCommon. At block 180, the UE discards the dedicated radioResourceConfigCommon. At block 190, the UE applies the common configuration including common radioResourceConfigCommon acquired from cell B.

If it is determined at block 160 that the UE does have valid stored system information for cell B, the process ends. That is, the UE uses the dedicated radioResourceConfigCommon when it has valid stored system information and uses the common configuration including common radioResourceConfigCommon when it does not have valid stored system information. Therefore, depending on the validity of the stored system information, the UE could apply different sets of configuration parameters.

The dedicated radioResourceConfigCommon might be different from the common radioResourceConfigCommon of the target cell for one or more reasons. First, to reduce the message size, the network may only include a minimum partial configuration in the handover command and may rely on the UE to obtain the rest from the common radioResourceConfigCommon. Second, there may be a mismatch between the handover command and the broadcast configuration.

Third, the dedicated configuration may be a delta-configuration from the configuration of the source cell of the handover. The network is required to determine the configuration delta between the two cells. When the system information changes on either cell, the delta may need to change. If the handover is coincident with a system information modification on the source cell, the network will not know whether the UE has acquired the new system information, so it will not know whether to delta from the old or new configuration. Hence, the delta-configuration sent to the UE may be delta from a configuration different from the one currently used by the UE.

Fourth, the UE may be being handed over from a cell of one release, for example Release 8, to a cell of a later release, for example Release 9 or 10. The later release may have introduced various new parameters to the radioResourceConfigCommon configuration. The dedicated radioResourceConfigCommon in the handover message received from the earlier release cell will not include the new parameters, but the common configuration including radioResourceConfigCommon broadcast by the target cell will include the new parameters. If the UE continues to use the dedicated radioResourceConfigCommon after the handover, then the UE will not be aware of the new parameters and hence will not be able to use the new features related to those new parameters.

There is no requirement for the UE to use the stored configuration if the UE has a valid stored configuration. Hence, after a handover, the UE will continue to use the dedicated radioResourceConfigCommon if the stored system information is valid.

In an embodiment, after a handover to a cell, if the UE determines that it has valid stored system information for the cell, then the UE discards the dedicated radioResourceConfigCommon that was received in the handover command and applies the common radioResourceConfigCommon from the stored system information. This embodiment ensures that the UE does not continue to use the dedicated radioResourceConfigCommon that was received in the handover command and that may be different from the common radioResourceConfigCommon that is sent in system information of the cell.

The following pseudo code illustrates an embodiment of this solution:

---

Upon receipt of a RRCConnectionReconfiguration containing mobilityControlInfo.
...
    apply the dedicated radioResourceConfigCommon.
.....
    synchronize to and access the new cell.
    Obtain MIB and SIB1 from the new cell.
    If there is no valid stored common radioResourceConfigCommon
    for the new cell
        Obtain SIB2 from the new cell
        Discard the dedicated radioResourceConfigCommon
        Apply the common radioResourceConfigCommon
    Else
        Discard the dedicated radioResourceConfigCommon
        Apply the stored common radioResourceConfigCommon

---

The final two steps in this example are currently not performed, so the UE is currently required to continue using the dedicated radioResourceConfigCommon.

Figure 2:
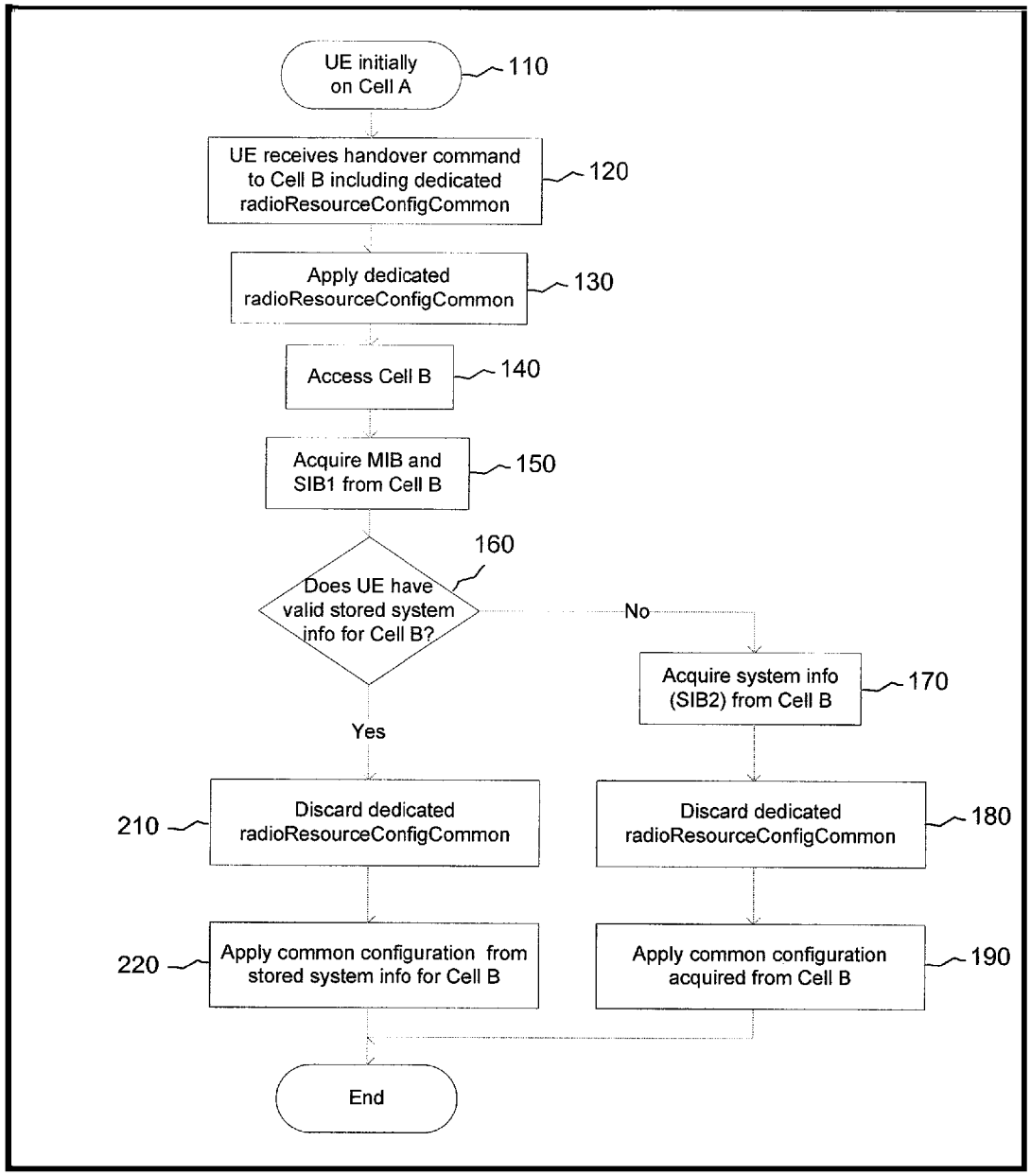
FIG. 2 is a flow chart of an application of common configuration including radioResourceConfigCommon according to an embodiment of the disclosure.

An embodiment of a solution that includes these two steps is illustrated in FIG. 2. The actions that occur at blocks 110 through 190 in FIG. 2 are the same as the actions that occur in the equivalent blocks in FIG. 1. However, different actions occur in FIG. 2 if it is determined at block 160 that the UE does have valid stored system information for cell B. In this embodiment, at block 210, the UE discards the dedicated radioResourceConfigCommon. At block 220, the UE applies the common configuration including common radioResourceConfigCommon from the stored system information for cell B.

In an alternative embodiment, upon being commanded to perform handover to a target cell, the UE determines the validity of its stored system information for the target cell. If the UE determines that it has valid stored system information for the target cell, then the UE discards the dedicated radioResourceConfigCommon that was received in the handover command and applies the common configuration including radioResourceConfigCommon from the stored system information. Thus, in this embodiment, at the time a handover occurs, the UE uses the common configuration including radioResourceConfigCommon from the stored system information to access the target cell. This can be contrasted with the previous embodiment, where the UE uses the dedicated radioResourceConfigCommon that was received in the handover command to access the target cell at handover and then overwrites it with the common configuration including radioResourceConfigCommon from the stored system information.

Figure 3:
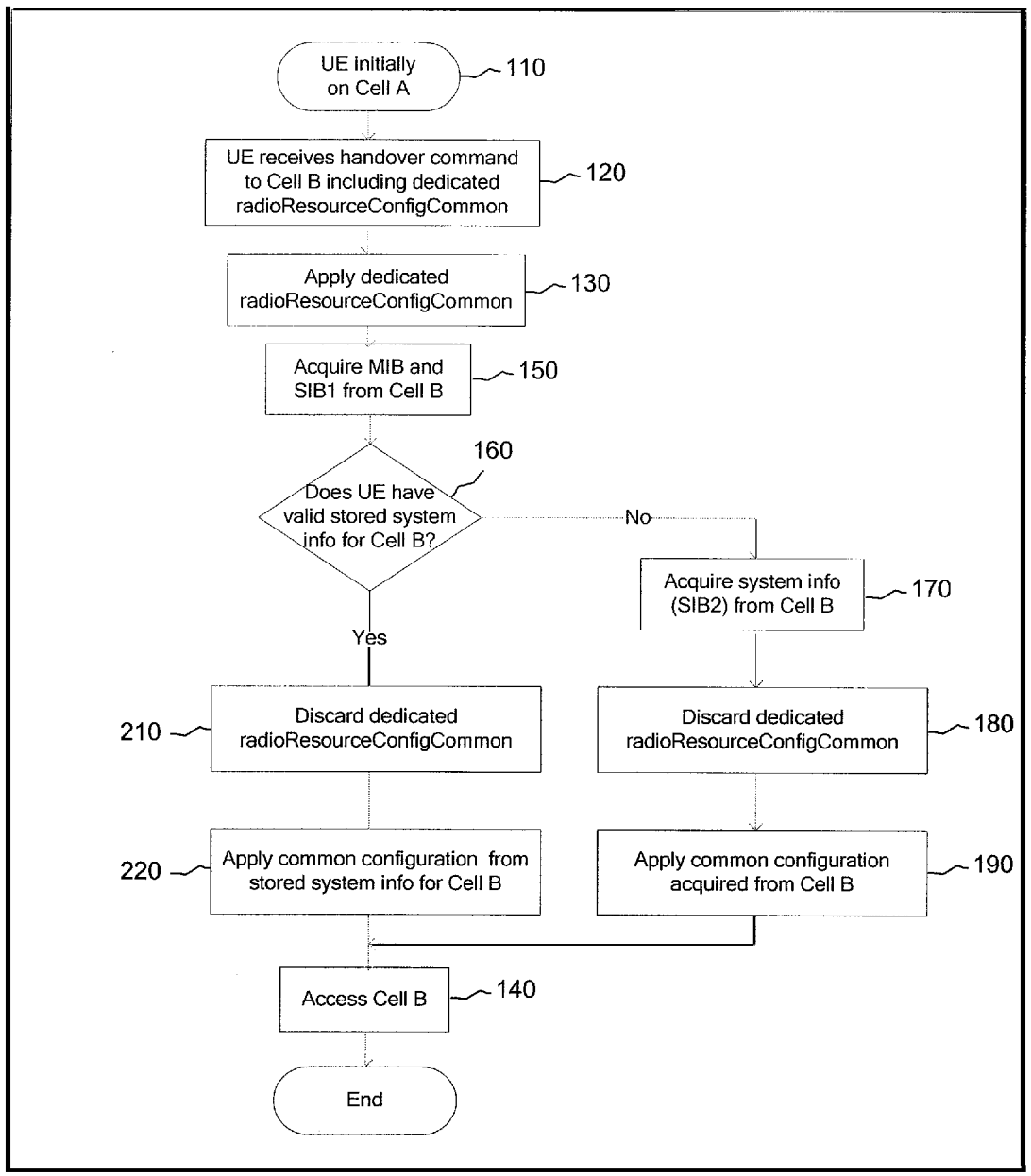
FIG. 3 is a flow chart of an application of common configuration including radioResourceConfigCommon according to an alternative embodiment of the disclosure.

FIG. 3 illustrates this embodiment. In this case, the actions at blocks 150, 160, 210 and 220 occur after the action at block 130. The action at block 140, namely the handover or the accessing of cell B, occurs after the UE, at block 220, has applied the common configuration from the stored system information for cell B.

The 36.331 specification can be modified in multiple ways to implement these embodiments. Several examples of possible modifications are now provided. In a first example, section 5.2.2.4 could be modified as follows:

---

1> following successful handover completion
2> if the UE does not have stored a valid version of the system information required in RRC_CONNECTED, as defined in 5.2.2.3:
    3> acquire, using the system information acquisition procedure as defined in 5.2.3, the system information required in RRC_CONNECTED, as defined in 5.2.2.3;
    3> upon acquiring the concerned system information:
        4> discard the corresponding radio resource configuration information included in the radioResourceConfigCommon previously received in a dedicated message
2> otherwise
    3> discard the corresponding radio resource configuration information included in the radioResourceConfigCommon previously received in a dedicated message; and
    3> apply the configuration from the stored system information.

---

In a second example, section 5.2.2.4 could be modified as follows:

---

1> following successful handover completion
    2> if the UE does not have stored a valid version of the system information required in RRC_CONNECTED, as defined in 5.2.2.3:
        3> acquire, using the system information acquisition procedure as defined in 5.2.3, the system information required in RRC_CONNECTED, as defined in 5.2.2.3;
        3> upon acquiring the concerned system information:
            4> discard the corresponding radio resource configuration information included in the radioResourceConfigCommon previously received in a dedicated message
    2> otherwise
        3> discard the corresponding radio resource configuration information included in the radioResourceConfigCommon previously received in a dedicated message; and
        3> apply the common configuration including common radioResourceConfigCommon from the stored system information.

---

In a third example, section 5.3.5.4 could be modified as follows:

---

1> apply the value of the newUE-Identity as the C-RNTI;
1> configure lower layers in accordance with the received radioResourceConfigCommon;
Note: The radioResourceConfigCommon received by dedicated signalling is replaced by the broadcast configuration of the target cell as soon as it is available.
1> configure lower layers in accordance with any additional fields, not covered in the previous, if included in the received mobilityControlInfo;

---

In a fourth example, section 5.3.5.4 could be modified as follows:

---

1> apply the value of the newUE-Identity as the C-RNTI;
1> configure lower layers in accordance with the received radioResourceConfigCommon;
    2> The radioResourceConfigCommon received by dedicated signalling shall be replaced by the broadcast configuration of the target cell as soon as it is available.

A fifth example could be considered an extension to the third and fourth examples. If the present embodiments are implemented, some text in section 5.2.2.4 may become redundant, with duplicate information. Hence some text can be deleted. In the fifth example, section 5.2.2.4 could be modified as follows:

---

1> configure lower layers in accordance with any additional fields, not covered in the previous, if included in the received mobilityControlInfo;

---

1> if the UE is in RRC_IDLE and enters a cell for which the UE does not have stored a valid version of the system information required in RRC_IDLE, as defined in 5.2.2.3:
   2> acquire, using the system information acquisition procedure as defined in 5.2.3, the system information required in RRC_IDLE, as defined in 5.2.2.3;
1> following a request from CDMA2000 upper layers:
   2> acquire SystemInformationBlockType8, as defined in 5.2.3

---

Figure 4:
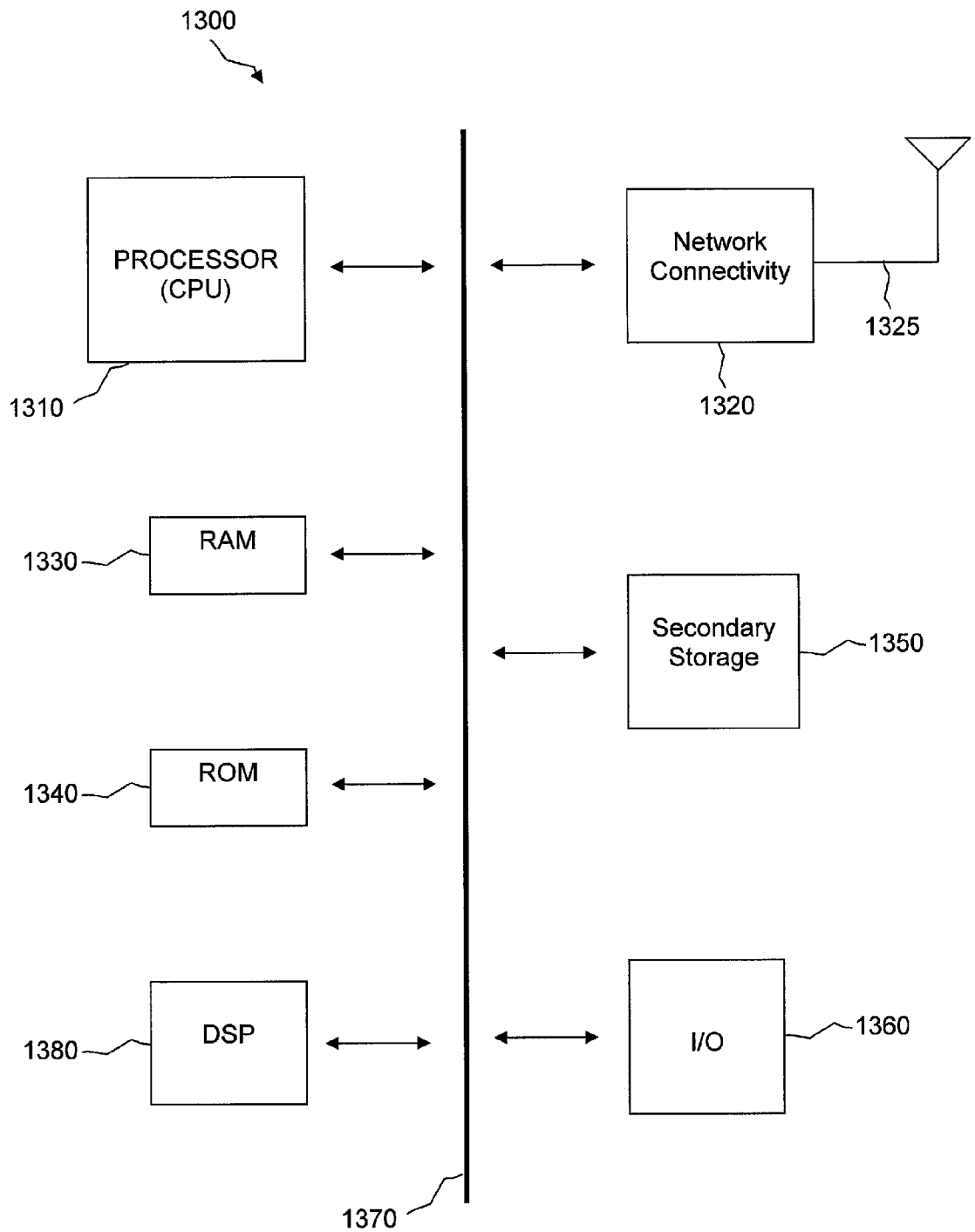
FIG. 4 illustrates a processor and related components suitable for implementing the several embodiments of the present disclosure.

The UE and other components described above might include a processing component that is capable of executing instructions related to the actions described above. FIG. 4 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1380. Although the DSP 1380 is shown as a separate component, the DSP 1380 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information. The network connectivity devices 1320 might also include one or more transceiver components 1325 capable of transmitting and/or receiving data wirelessly.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1325 might be considered to be a component of the I/O devices 1360 instead of or in addition to being a component of the network connectivity devices 1320.

In an embodiment, a method for a UE operating in an LTE network is provided. The method includes the UE receiving a command for a handover from a source cell to a target cell. The method further includes, when the UE has valid stored system information for the target cell, the UE discarding a dedicated radioResourceConfigCommon information element received from the source cell in the handover command and the UE applying radio resource configuration information retrieved from the stored system information.

In another embodiment, a UE is provided. The UE includes a processor configured such that the UE receives a command for a handover from a source cell to a target cell and, when the UE has valid stored system information for the target cell, the UE discards a dedicated radioResourceConfigCommon information element received from the source cell in the handover command, and the UE applies radio resource configuration information retrieved from the stored system information.

In another embodiment, another method for a UE operating in an LTE network is provided. The method includes the UE receiving a command for a handover from a source cell to a target cell. The method further includes the UE overwriting information elements of dedicated system information with corresponding information elements of at least one of newly received system information and stored valid system information.

The following is incorporated herein by reference for all purposes: 3rd Generation Partnership Project (3GPP) Technical Specification (TS) 36.331, Version 8.9.0.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for a user equipment (UE) operating in a Long Term Evolution network, comprising:
   the UE receiving a command for a handover from a source cell to a target cell; and
   when the UE has valid stored system information for the target cell, the UE discarding a dedicated radioResourceConfigCommon information element received from the source cell in the handover command and the UE applying radio resource configuration information retrieved from the stored system information.

2. The method of claim 1, wherein the radio resource configuration information includes common configuration including common radioResourceConfigCommon retrieved from the stored system information.

3. The method of claim 1, wherein the UE discards the dedicated radioResourceConfigCommon information element and applies the radio resource configuration information retrieved from the stored system information after accessing the target cell.

4. The method of claim 1, wherein the UE discards the dedicated radioResourceConfigCommon information element and applies the radio resource configuration information retrieved from the stored system information before accessing the target cell.

5. A user equipment (UE), comprising:
   a processor configured such that the UE receives a command for a handover from a source cell to a target cell and, when the UE has valid stored system information for the target cell, the UE discards a dedicated radioResourceConfigCommon information element received from the source cell in the handover command, and the UE applies radio resource configuration information retrieved from the stored system information.

6. The UE of claim 5, wherein the radio resource configuration information includes common configuration including common radioResourceConfigCommon retrieved from the stored system information.

7. The UE of claim 5, wherein the UE discards the dedicated radioResourceConfigCommon information element and applies the radio resource configuration information retrieved from the stored system information after accessing the target cell.

8. The UE of claim 5, wherein the UE discards the dedicated radioResourceConfigCommon information element and applies the radio resource configuration information retrieved from the stored system information before accessing the target cell.

9. A method for a user equipment (UE) operating in a Long Term Evolution network, comprising:
   the UE receiving a command for a handover from a source cell to a target cell;
   the UE discarding a dedicated radioResourceConfigCommon information element received from the source cell in the handover command; and
   the UE overwriting information elements of dedicated system information with corresponding information elements of stored valid system information.

10. The method of claim 9, wherein the UE uses the stored valid system information when the UE determines from a first set of system information that the UE has already stored a valid second set of system information.

11. The method of claim 9, wherein the stored valid system information includes radio resource configuration information that includes common configuration including common radioResourceConfigCommon.

12. The method of claim 9, wherein the UE overwrites the previously received dedicated system information after accessing the target cell.

13. The method of claim 9, wherein the UE overwrites the previously received dedicated system information before accessing the target cell.

* * * * *